US011113345B2

(12) United States Patent
Keane et al.

(10) Patent No.: US 11,113,345 B2
(45) Date of Patent: Sep. 7, 2021

(54) METHOD AND SYSTEM FOR PROVIDING CONTEXTUAL ELECTRONIC CONTENT (71) Applicant: BigTinCan Holdings Limited, Sydney (AU)

(72) Inventors: David Malcolm Keane, Lexington, MA (US); Anthony Turco, Sydney (AU)

(73) Assignee: BIGTINCAN HOLDINGS LIMITED, Sydney (AU)

(*) Notice: Subject to any disclaimer, the term of this patent is extended or adjusted under 35 U.S.C. 154(b) by 0 days.

(21) Appl. No.: 15/317,866

(22) PCT Filed: Jul. 15, 2015

(86) PCT No.: PCT/AU2015/000412
§ 371 (c)(1),
(2) Date: Dec. 9, 2016

(87) PCT Pub. No.: WO2016/007992
PCT Pub. Date: Jan. 21, 2016

(65) Prior Publication Data
US 2017/0116342 A1 Apr. 27, 2017

(30) Foreign Application Priority Data
Jul. 17, 2014 (AU) ................ 2014902766

(51) Int. Cl.
G06F 16/9535 (2019.01)
G06F 16/172 (2019.01)
(Continued)

(52) U.S. Cl.
CPC ........ *G06F 16/9535* (2019.01); *G06F 16/172* (2019.01); *G06F 16/24578* (2019.01);
(Continued)

(58) Field of Classification Search
CPC ............ G06Q 10/0833; G06Q 30/0261; H04L 67/22; H04W 4/029; G06F 17/30017;
(Continued)

(56) References Cited

U.S. PATENT DOCUMENTS 8,972,570 B1* 3/2015 Moreels ............. G06Q 10/0833
709/224
9,215,420 B2* 12/2015 Suslov ................ G06F 17/3053
(Continued)

OTHER PUBLICATIONS

PCT; App. No. PCT/AU2015/000412; International Preliminary Report on Patentability; dated Sep. 5, 2016.
(Continued)

*Primary Examiner* — Dennis Truong
(74) *Attorney, Agent, or Firm* — Fitch, Even, Tabin & Flannery LLP (57) ABSTRACT Aspects of the present disclosure are directed to a method of providing content to a user device based on contextual parameters. The method includes monitoring one or more contextual parameters to detect a change in the values of the one or more contextual parameters and retrieving content from one or more content sources based on the changed contextual parameter. Furthermore, the method includes applying weights associated with the content to the retrieved content, generating results based on the weighted content and providing the generated results to the user device based on one or more device parameters.

38 Claims, 5 Drawing Sheets (51) Int. Cl.
*G06F 16/93* (2019.01)
*G06F 16/2457* (2019.01)
*G06F 11/30* (2006.01)
*G06N 5/04* (2006.01)

(52) U.S. Cl.
CPC .............. *G06F 16/93* (2019.01); *G06F 11/30* (2013.01); *G06N 5/04* (2013.01)

(58) Field of Classification Search
CPC .......... G06F 17/3053; G06F 17/30554; G06F 16/172; G06F 16/9574; G06F 16/9535; G06F 16/93; G06F 16/24578; G06F 11/30; G06N 5/02; G06N 5/047; G06N 7/005; G06N 99/005; G06N 5/04; H04M 2250/12; H04N 21/4532; H04N 21/454; H04N 21/4755; H04N 21/4826
USPC ..................... 1/1; 707/748; 706/48; 715/747
See application file for complete search history.

(56) References Cited

U.S. PATENT DOCUMENTS

| | | | | |
|---|---|---|---|---|
| 2005/0132006 | A1* | 6/2005 | Horvitz | G06Q 10/109 709/204 |
| 2006/0253444 | A1* | 11/2006 | O'Toole | G06F 16/9537 |
| 2007/0078828 | A1* | 4/2007 | Parikh | G06F 16/9535 |
| 2007/0198698 | A1* | 8/2007 | Boyd | H04L 67/1095 709/224 |
| 2008/0016205 | A1* | 1/2008 | Svendsen | G06F 17/30017 709/224 |
| 2008/0134053 | A1* | 6/2008 | Fischer | G06Q 10/02 715/747 |
| 2008/0140941 | A1* | 6/2008 | Dasgupta | G06F 16/172 711/137 |
| 2009/0037355 | A1* | 2/2009 | Brave | G06F 16/9535 706/45 |
| 2009/0138505 | A1* | 5/2009 | Purdy | G11B 27/105 |
| 2009/0287750 | A1* | 11/2009 | Banavar | H04L 29/06 |
| 2012/0272156 | A1* | 10/2012 | Kerger | H04M 3/487 715/747 |
| 2013/0031216 | A1 | 1/2013 | Willis et al. | |
| 2013/0290110 | A1* | 10/2013 | LuVogt | G06F 17/30867 705/14.66 |
| 2013/0297551 | A1* | 11/2013 | Smith | G06N 5/02 706/48 |
| 2014/0075328 | A1* | 3/2014 | Hansen | G06F 3/0487 715/747 |
| 2014/0156793 | A1* | 6/2014 | Chan | H04L 67/1097 709/217 |
| 2014/0282636 | A1* | 9/2014 | Petander | H04N 21/41407 725/1 |
| 2014/0297655 | A1* | 10/2014 | Paglia | H04L 67/22 707/748 |
| 2014/0359074 | A1* | 12/2014 | Igelka | G06F 16/9574 709/219 |
| 2015/0294221 | A1* | 10/2015 | Andres Gutierrez | G06Q 30/0261 706/46 |
| 2017/0140285 | A1* | 5/2017 | Dotan-Cohen | H04W 4/02 |

OTHER PUBLICATIONS

PCT; App. No. PCT/AU2015/000412; Written Opinion dated Aug. 3, 2015; pp. 1-7.
PCT; App. No. PCT/AU2015/000412; International Search Report dated Aug. 3, 2015; pp. 1-4.
Fontijn, W et al., "Integrating Media Management Towards Ambient Intelligence", Third International Workshop, AMR 2005, Glasgow, UK, Jul. 28-29, 2005; pp. 1-10.
Boncz, C. et al., "Ambient DB: Relational Query Processing in a P2P Network", DBISP2P Workshop 2003, Berlin (co-located with VLDB'03), LNCS 2788, Springer Verlag; pp. 153-168.
Chen, G. et al., "A Survey of Context-Aware Mobile Computing Research", published on Nov. 14, 2005; pp. 1-24.
Shin et al., "Context-aware recommendation by aggregating user context," IEEE Conference on Commerce and Enterprise Computing, Jul. 20-23, 2009, Vienna, Austria; pp. 423-430.

* cited by examiner

METHOD AND SYSTEM FOR PROVIDING CONTEXTUAL ELECTRONIC CONTENT

CROSS-REFERENCE TO RELATED APPLICATION

This application is a U.S. national phase application of International Application No. PCT/AU2015/000412, filed Jul. 15, 2015, designating the United States, which claims priority to Australian Application No. 2014902766, filed Jul. 17, 2014, which is incorporated by reference herein in its entirety.

TECHNICAL FIELD

Aspects of the present disclosure relate generally to computing systems and more particularly, to methods and systems for providing content on user devices based on contextual information, and to a computer program product including a computer readable medium having recorded thereon a computer program for providing content based on contextual information.

BACKGROUND

Within any business, the use and exchange of electronic content (e.g., text, audio, video, images, multimedia material, webpages or executables) is paramount. Traditionally, businesses have controlled content delivery within the organization by applying simple access rules or permissions. However, these access permissions are insufficient for delivering data in today's environment.

Moreover, the advent of mobile devices has led to new issues and opportunities surrounding content delivery and user interaction. For instance, using traditional access systems, users cannot access data while they are in the field or in a client meeting. In these situations, as the user is disconnected from the organization's data servers, it is difficult for a user to extract content from the servers, even if they had permission to do so. Moreover, users may often forget to download or retrieve relevant files on their mobile devices from the data servers before stepping out for the meeting. Even in these cases, it is difficult for the user to access the relevant files once they are disconnected from the company data servers.

A few mobile applications and Internet cloud-based applications automatically push content on a user's device. However, these applications are only able to provide information that a user has access to in a very specific set of resources—normally resources controlled by the same application or cloud provider. Moreover, these systems can only push data to user devices based on limited information that the system stores, and that data can only be sent to the user device when the user device is online. Furthermore, these conventional systems display the same information on any device irrespective of the device capabilities.

Accordingly there exists a need for a method and system that can automatically push content on a user's mobile device to create a more efficient and secure method of delivering electronic content to one or more users.

SUMMARY

It is an object of the present invention to overcome, or at least ameliorate, one or more disadvantages of existing arrangements.

According to one aspect of the present disclosure, a method for providing content to a user device based on contextual parameters is provided. The method includes monitoring one or more contextual parameters to detect a change in the values of the contextual parameters, and retrieving content from one or more content sources based on the changed contextual parameters. Moreover, the method includes applying weights associated with the content to the retrieved content, generating results based on the weighted content, and providing the generated results to the user device based on the one or more device parameters.

According to another aspect of the present disclosure, a contextual information system is provided. The system includes a monitoring module configured for monitoring one or more contextual parameters to detect a change in the values of the one or more contextual parameters and an input module configured for retrieving content from one or more content sources based on the changed contextual parameters. The system further includes a decision engine configured for applying weights to the retrieved content and generating results based on the weighted content. Moreover, the system includes an output module configured for providing the generated results to the user device based on the one or more parameters associated with the user device.

According to yet another aspect of the present disclosure, a computer readable medium having a computer program stored on the medium for providing content to a user device based on contextual parameters is provided. The program includes code for monitoring one or more contextual parameters to detect a change in the values of the one or more contextual parameters, and code for retrieving content from one or more content sources based on the changed contextual parameter. The program further includes code for applying weights associated with the content to the retrieved content and generating results based on the weighted content. Moreover, the program includes code for providing the generated results to the user device based on the one or more device parameters.

BRIEF DESCRIPTION OF THE DRAWINGS

One or more embodiments of the present invention will now be described with reference to the drawings and appendices, in which.

While the systems and methods described herein are amenable to various modifications and alternative forms, specific implementations are shown by way of example in the drawings and are described in detail. It should be understood, however, that the drawings and detailed description thereto are not intended to limit the systems and methods described herein to the particular form disclosed, but on the contrary, the intention is to cover all modifications, equivalents, and alternatives falling within the spirit and scope of the present invention as defined by the appended claims.

DETAILED DESCRIPTION INCLUDING BEST MODE

Specific arrangements will now be described in detail with reference to the accompanying figures. Like elements in the various figures are denoted by like reference numerals for consistency.

In the following detailed description, numerous specific details are set forth in order to provide a more thorough understanding of the methods and system disclosed below. In other instances, description of well-known features is excluded to avoid obscuring the disclosed methods and systems.

Aspects of the present disclosure relate to contextual information systems and methods that provide content to a user's mobile device based on contextual information such as information about the user, the user's organization and clients, previous search results, time of day, location, and/or weather. The contextual information systems and methods also provide content based on device capabilities and network connectivity, and automatically push the content to the user's device. By pushing content based on contextual information, the system provides information that is relevant to the user at that particular time, thereby improving work effectiveness.

In other words, aspects of the disclosed contextual information system provide a comprehensive solution for using contextual information to securely deliver the right content and information to the user to increase user productivity, increase sales, customer satisfaction and competitive advantage.

In the present disclosure, the contextual information system is described with reference to a business environment. However, it will be appreciated that the contextual information system can also be utilized in other collaborative environments, such as in universities for group research, or at home to connect multiple family members. For example, a user can utilize the contextual information system to automatically push videos, movies, news, or the user's favourite songs from his/her home or work computer or from the Internet before leaving their home/work. As such, the contextual information system can effectively use limited device memory by automatically modifying the content on mobile devices based on user preferences and device capabilities.

Figure 1:
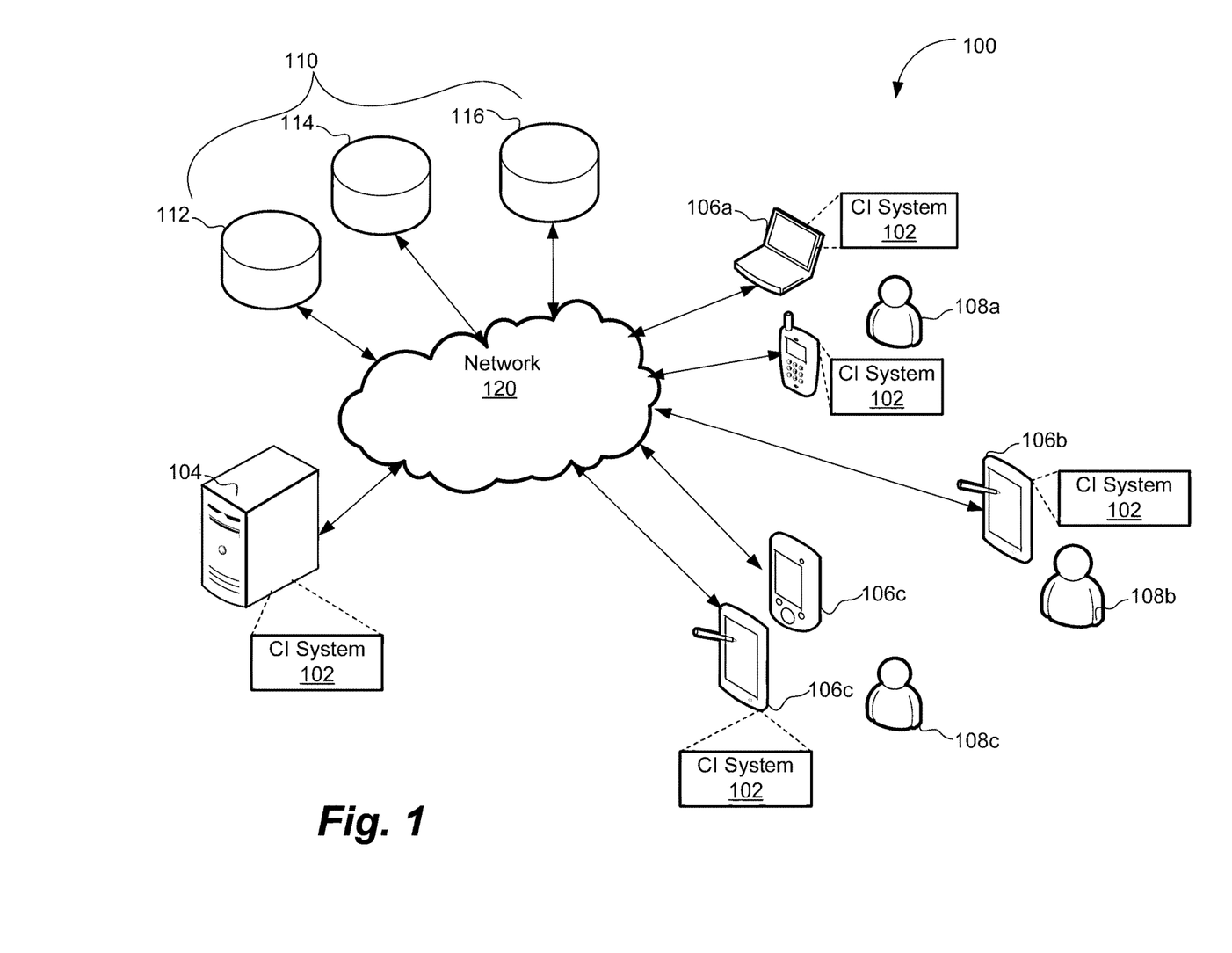
FIG. 1 is a schematic block diagram of a platform for use in implementing a contextual information system according to the present disclosure.

FIG. 1 is a block diagram of a platform 100 where the contextual information system of the present disclosure can be implemented. The platform 100 includes a contextual information (CI) system 102 installed and executing on a server 104 and/or on one or more user devices 106a, 106b, 106c, ... 106n (collectively referred to as user devices 106). Network 120 interconnects and operatively couples the user devices 106 to the server 104. Further, one or more users 108a, 108b ... 108c (collectively referred to as users 108) operate the user devices 106. The platform 100 also includes one or more content and/or CI sources 110 operatively coupled to the server 104 and/or to the user devices 106 through the network 120. The content or CI sources 110 include a content management system 112, a corporate information database 114, and/or one or more online content sources 116.

The user devices 106 can be any mobile electronic device that is capable of exchanging data over the network 120. Examples of such electronic devices include personal computers, laptops, tablets, mobile phones or other handheld devices. The user devices 106 are also capable of executing one or more client applications. Moreover, as referred to in the present disclosure, a 'user' 108 of the platform 100 includes an individual person, an administrator of an organization, or an organization including multiple persons.

The network 120 may be a wide-area network (WAN) such as the Internet, a cellular telecommunications network such as a 2G, 3G, 4G, LTE, or HSDPA network, or a private WAN that allows data transfer between the server, computing devices, and databases, or a local area network that is created using technology such as Bluetooth LE or other local area networking technologies.

Furthermore, the content management system 112 includes shared databases on the network 120 maintained by one or more people or an organization for storing content such as documents, movies, pictures, phone numbers, and scientific data. Furthermore, the content management system 112 is configured to organize the content and provide version-controlled access to the content. For instance, the content management system may index and organize all the documents based on their inherent and user-defined properties so that the documents can be easily accessed or retrieved when required.

The corporate information database 114 is configured to store information related to the employees of the organization, such as user profiles, permissions, team profiles, and ongoing projects. Moreover, the corporate information database can store each employee's calendar including past and future meeting schedules. The corporate information database 114 can also store information regarding all participants and venues of meetings for each user 108.

The online sources 116 include any dynamic content providers/aggregators or service websites including weather information providers, location information sources including Global Positioning Systems (GPS) and network signals such as IP addresses, RFID, Wi-Fi, Bluetooth, MAC addresses, and GSM/CDMA cell IDs, video or audio aggregators, online magazines, document websites, news websites, airline websites, social websites, etc. Essentially, online sources 116 refer to sources currently available on the Internet or that will be made available in the future.

The CI system 102 monitors several contextual parameters and when a change is detected in any one of those parameters, the CI system 102 retrieves content from the content sources 110 to generate recommendations, decisions and/or actions based on the monitored contextual information and the retrieved content for a particular user 108. Furthermore, the CI system 102 pushes the recommendations/decisions/actions best suited for a particular user device 106 based on device capabilities. For instance, if the CI system 102 has detected that a user's geographical location is changing and the user has a meeting scheduled at a particular destination, the CI system 102 may retrieve relevant documents/files for the meeting, driving directions to reach the particular destination, and recommend a podcast for the journey. Subsequently, the CI system 102 may send the documents/files to the user's tablet as the tablet has a bigger screen, and the driving directions and podcast to the user's smart phone as the smart phone has 3G connectivity, an installed map application, and an audio player.

Figure 2:
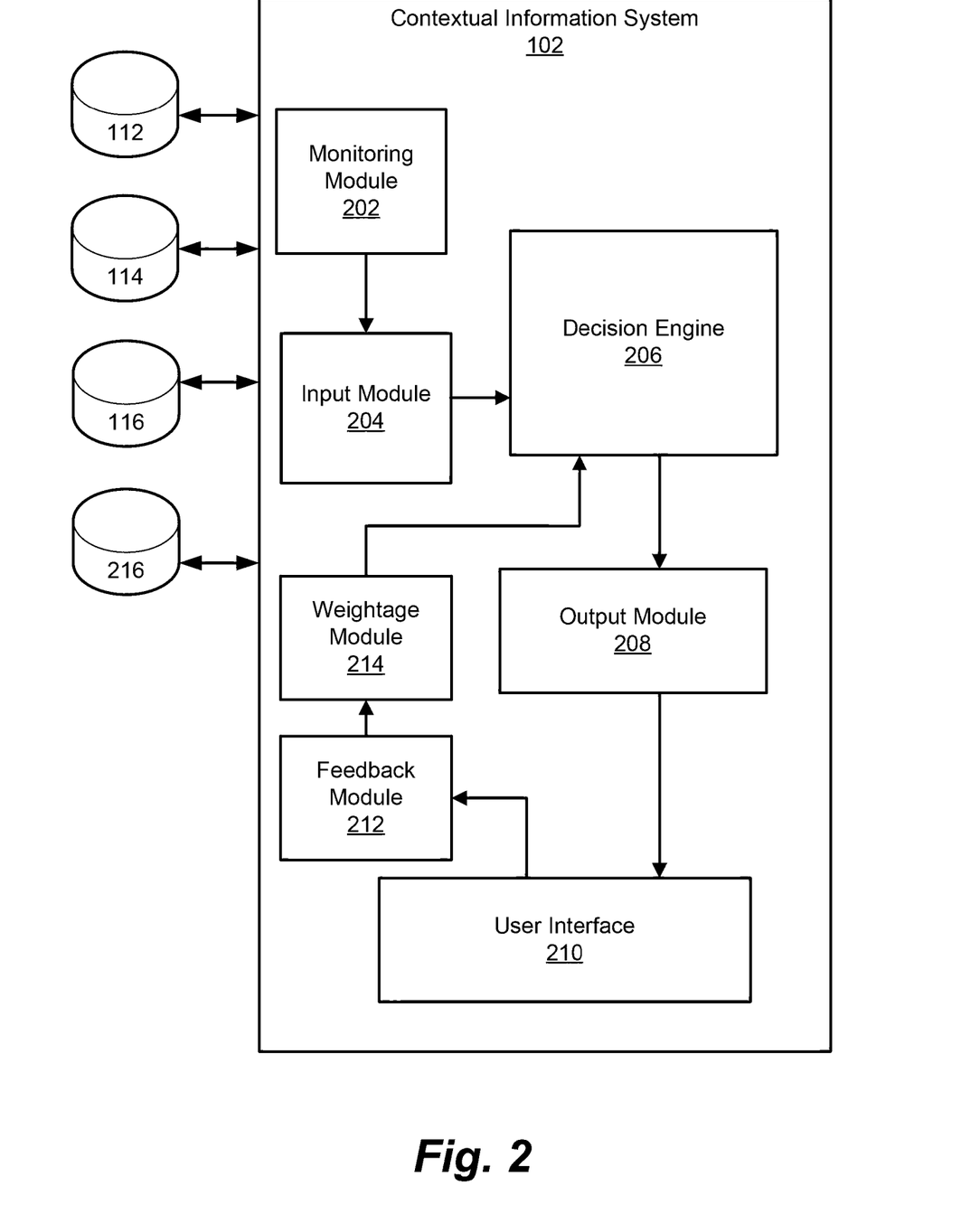
FIG. 2 is a block diagram of the contextual information system of FIG. 1.

Aspects of the CI system 102 will be described with reference to FIG. 2. The CI system 102 includes a monitoring module 202, an input module 204, a decision engine 206, an output module 208, a user interface 210, a feedback module 212, and a weightage module 214. Furthermore, the CI system 102 is operatively coupled to a memory module 216 on the user device 106. The CI system 102 is also operatively coupled to content sources 110, the server 104 and/or the user device 106 through the network 120. Additionally, the CI system 102 may be implemented by one or more software modules of software application program 333 (see FIG. 3A) resident on the user device 106 and/or the server 104.

In one arrangement, some modules of the CI system 102 are present on the server 104, while other modules are present on the user device 106. For instance, the monitoring module 202, the input module 204, the weightage module 214, the decision engine 206, and the output module 208 can be installed on the server 104, while the feedback module 212 and the user interface 210 are installed on the user device 106. In this case, the output module 208 communicates results to the user interface 210 via network 120 and the feedback module 212 communicates user inputs to the weightage module 214 and the decision engine 206 through the network 120. It will be understood that in other aspects, the modules present on the server 104 and the user device 106 may vary without departing from the scope of the present disclosure. However, in all cases where some modules of the CI system 102 are present on the server 104 and others on the user device 106, the CI system 102 functions when a network connection is available. Moreover, the modules installed on the user device 106 are in the form of a client application.

Alternatively, all the modules of the CI system 102 are installed on the user device 106. With such an arrangement, the CI system 102 can also operate when the user device 106 is disconnected from the network 120. However, in this case, the CI system 102 monitors the contextual parameters stored on the user device 106 and recommends content based on the content stored on the user device 106.

The monitoring module 202 is configured to monitor one or more contextual parameters associated with the user 108, the user device 106, or the environment and compare the monitored contextual parameters with configurable thresholds. There are various types of contextual parameters including, for example, "user" parameters, "device" parameters, and "environment" parameters. The user parameters include the user profile, permission, meeting schedule, meeting history, and search history among other parameters. Examples of the device parameters include the type of user device, network connectivity, installed applications, available memory, and screen size. Examples of environment parameters include geographical location of the user device 106, time, date weather, etc. These contextual parameters can be defined by an external system administrator who can curate how the contextual variables are used. Moreover, the user 108 may be allowed to add, delete or modify any contextual parameter in any category as required. Furthermore, the user parameters can be monitored from the content management system 112 or the corporate information database 114, the environment parameters can be monitored from the online sources 116 and the device parameters can be monitored from the user device 106.

Any changes in the monitored contextual parameters that exceed the configured thresholds can activate the CI system 102 to retrieve content from the content sources 110 and user device 106. For instance, a geographical location threshold can be set to 500 m, and if the geographical location of the user device 106 changes by a value greater than 500 m, the input module 204 can be activated. Similarly, a meeting threshold can be set to 30 minutes prior to the meeting. Subsequently, if any user meeting is due in 30 minutes or less, the input module 204 can be activated. It will be understood that the threshold values for the contextual parameters can also be modified by the user 108 to allow the CI system 102 to provide more accurate recommendations.

For instance, if the user's office is located on a single floor in a city, the geographical location threshold can be decreased to a few meters. Alternatively, if the user's organization takes up an entire block, the geographical location threshold can be increased to a few hundred meters.

The frequency of monitoring the contextual parameters can also be configured. In some aspects, the monitoring module 202 continuously monitors the parameters. Alternatively, the frequency is reduced to once in a few seconds or minutes. In yet other aspects, the frequency is further reduced to particular times of the day. For example, the parameters may be monitored at the beginning or end of the day.

The input module 204 is configured to query the content sources 110 and the user device 106 to retrieve relevant data once the monitoring module 202 detects a change in one or more contextual parameters. Moreover, the type of data retrieved may vary based on the changed contextual parameter, the content already stored on the user device 106, or the user's search history. For instance, if the geographical location parameter has exceeded the threshold, the input module 204 may retrieve location maps, directions to a specific location, nearby restaurants or pubs (based on the time of the day). Alternatively, if a scheduled meeting is due, the input module 204 may be configured to retrieve data including, but not limited to, user's permissions, files related to the meeting that are not already on the user device 106, driving directions, approximate time to reach the meeting, and so on.

In one arrangement, the input module 204 includes one or more Application Programming Interfaces (APIs) that can search the content sources 110 for relevant information. For instance, if a meeting is due for a project named "sales project", the APIs query the content management system to retrieve all files for this project, and the online sources to retrieve driving directions and approximate time to destination.

Subsequently, the content sources 110 provide the requested data or links to the requested data to the input module 204. The retrieved data files or links retrieved from the content sources may be encrypted by the server 104 before being transmitted to the user device 106 using secure sockets layer (SSL) transmission.

The relevant data or links to the relevant data and the contextual parameters can be temporarily stored in the memory 216. Furthermore, the memory 216 may be configured to store device parameters and data that are eventually pushed to the user interface 210.

The weightage module 214 includes configurable weights that can be applied to the retrieved data and the contextual parameters to calculate recommendations/decisions or actions. The user 108 can configure these weights as required. For instance, more weight may be applied to recently modified documents or finalized documents as compared to recently added documents or drafts. Similarly, more weight can be applied to public transport directions as opposed to driving or walking directions. In other aspects, the weights may be automatically manipulated based on user feedback.

The decision engine 206 is configured to apply the weights from the weightage module 214 to the retrieved data and the contextual parameters to generate one or more actions, recommendations, or decisions. In the context of this disclosure, a 'recommendation' is when the decision engine 206 generates a list of files for the user to select. Files are downloaded on the user device once a selection is made. Conversely, an 'action' is when the decision engine 206 stores the retrieved files on the user device 106 without user intervention and then displays the list of files on the user interface 210 for the user to open. Similarly, a 'decision' is when the decision engine 206 pushes a single result to the user interface 210 for a given situation.

In one aspect, the decision engine 206 is configured to rank the retrieved content, select highest ranked content and provide this content to the output module 208. To that end, the decision engine 206 assigns scores to the weighted content and then ranks the content in decreasing order. Content with the top few rankings is selected as recommended results.

The decision engine 206 also determines whether it should push recommended results or hyperlinks to the recommended results to the user device 106. This decision is based on one or more parameters such as available device memory or network connectivity. Alternatively, the decision can be based on configurations set by the system administrator.

The output module 208 is configured to push the one or more results to the user device 106 based on device parameters. For example, documents are preferably pushed to devices with larger screens and an installed document reader application. Driving directions are preferably provided to devices with 3G capability. Client profiles are preferably pushed to devices with a LinkedIn® application, etc. However, if the user 108 has a single user device 106, all the recommended results are pushed to that user device 106 provided the device 106 has network connectivity.

The feedback module 212 is configured to monitor user inputs. In case of recommendations, the monitored user inputs reveal which files the user selected from the recommendation list. Similarly, in case of a decision, the feedback module 212 monitors whether the user selected or rejected the decision and in case of actions, the feedback module 212 monitors whether the user opened or deleted any of the downloaded files. Such user input data is then provided to the decision engine 206 and the weightage module 214 to automatically reconfigure weights and/or make calculations based on user preferences. In this manner, the CI system 102 continuously improves its outputs based on user feedback. For instance, if a user predominantly selects walking directions over driving directions for locations within a five kilometres radius, the feedback module 212 communicate this information to the weightage module 214, which consequently increases the weights for walking and decreases the weights for driving directions to locations within a five kilometres radius. Subsequently, the calculation engine 206 stops providing driving directions to such destinations unless expressly requested.

Figure 3A:
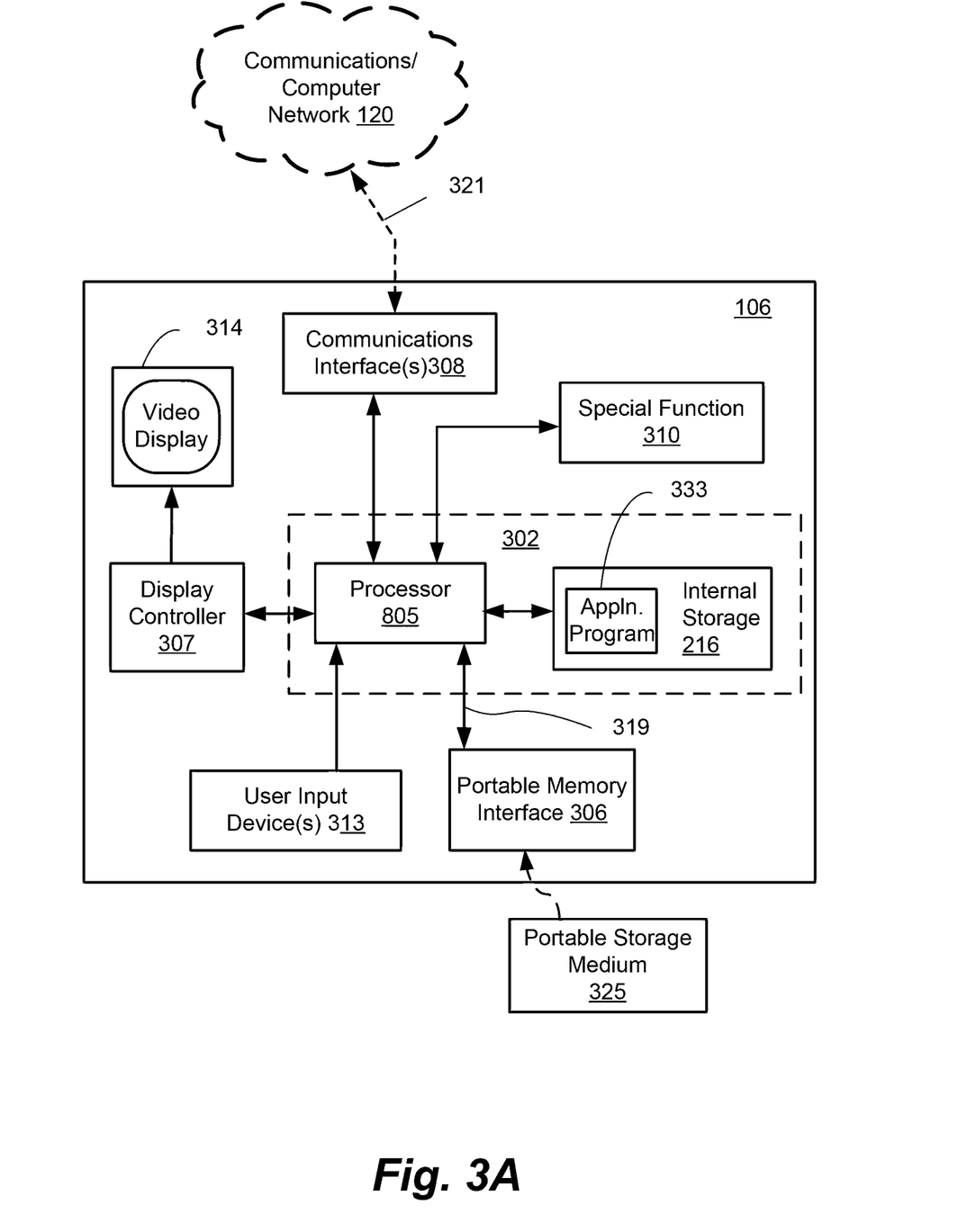
FIGS. 3A and 3B collectively form a schematic block diagram representation of an electronic device upon which described arrangements can be practised.
Figure 3B:
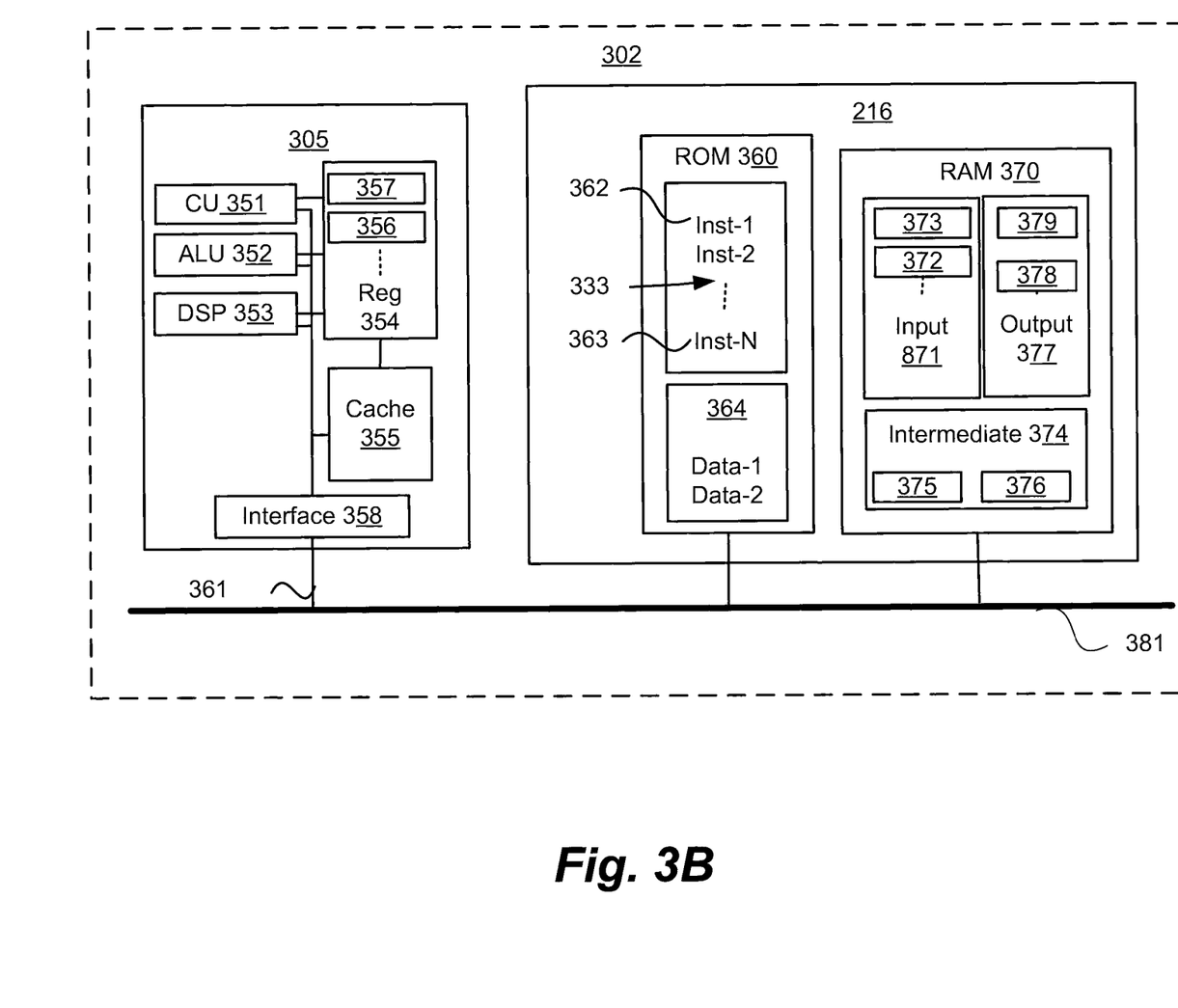

FIGS. 3A and 3B collectively form a schematic block diagram of the user device 106, which is a general purpose electronic device 106 including embedded components, upon which the CI system 102 may be implemented and the methods to be described are desirably practiced. The electronic device 106 may be, for example, a mobile phone, a smart phone, a tablet, or a phablet, in which processing resources are limited. Nevertheless, the methods to be described may also be performed on higher-level devices such as laptops, desktop computers, server computers, and other such devices with significantly larger processing resources.

As seen in FIG. 3A, the electronic device 106 comprises an embedded controller 302. Accordingly, the electronic device 106 may be referred to as an "embedded device." In the present example, the controller 302 has a processing unit (or processor) 305 which is bi-directionally coupled to the memory module 216. The memory module 216 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The electronic device 106 includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The electronic device 106 also includes user input devices 313 which are typically formed by keys, a keypad or like controls. In some implementations, the user input devices 313 may include a touch sensitive panel physically associated with the display 314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 3A, the electronic device 106 also comprises a portable memory interface 306, which is coupled to the processor 305 via a connection 319. The portable memory interface 306 allows a complementary portable memory device 325 to be coupled to the electronic device 106 to act as a data source or destination or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 106 also has a communications interface 308 to permit coupling of the device 106 to a computer or communications network 320 via a connection 321. The connection 321 may be wired or wireless. For example, the connection 321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 106 is configured to perform some special function. The embedded controller 302, possibly in conjunction with further special function components 310, performs that special function. For example, where the device 106 is a mobile phone, the components 310 may represent a microphone, a speaker and an interface for connection to cellular networks. The special function components 310 are connected to the embedded controller 302. Where the device 106 is a portable device, the special function components 310 may represent a number of encoders and decoders of a type including Joint Photographic Experts Group (JPEG), (Moving Picture Experts Group) MPEG, MPEG-1 Audio Layer 3 (MP3), and the like.

Figure 4:
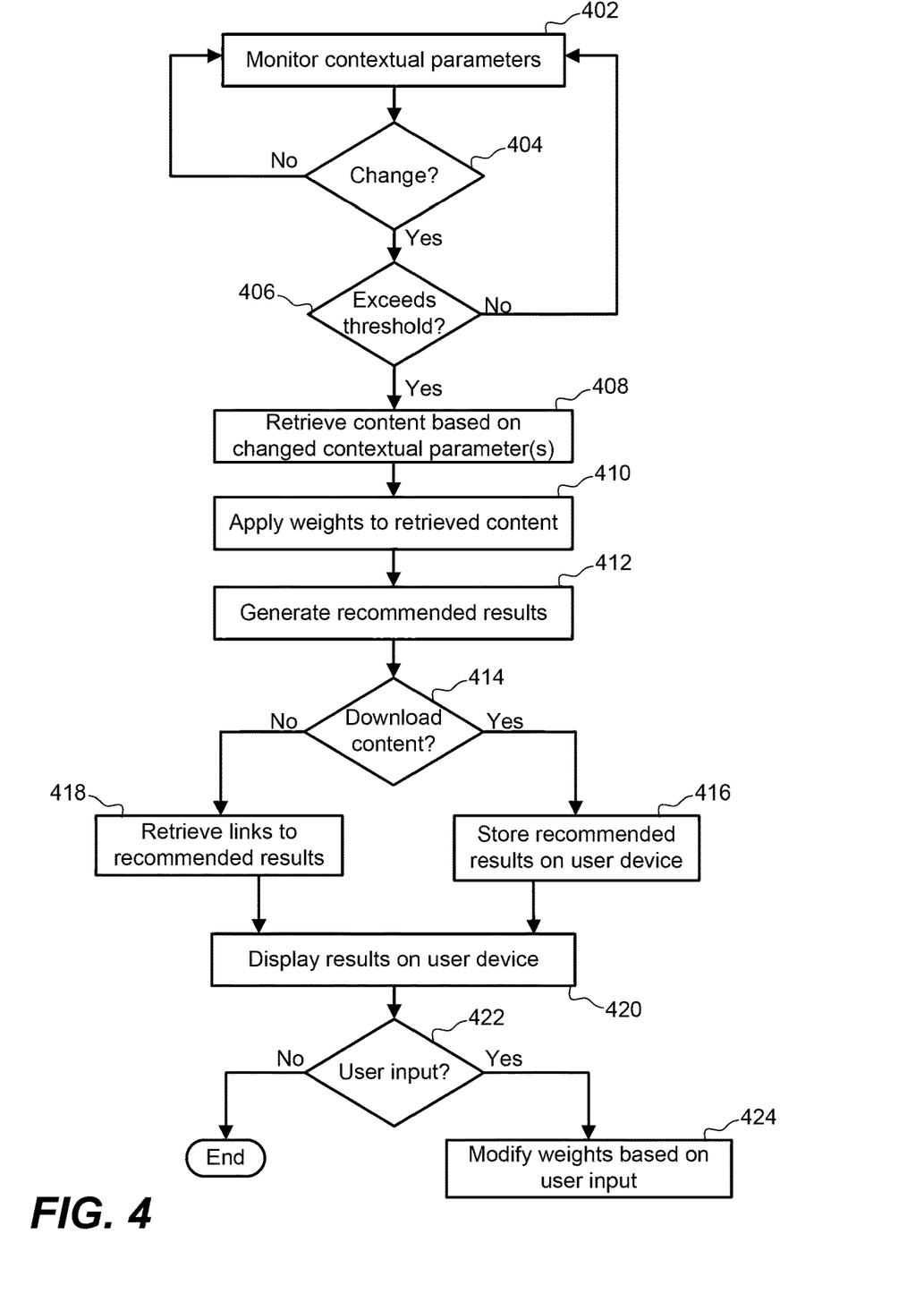
FIG. 4 is a flow chart illustrating a method for providing contextual content to a user device based on contextual information.

The methods described herein may be implemented using the embedded controller 302, where the processes of FIG. 4 may be implemented as one or more software application programs 333 executable within the embedded controller 302. The electronic device 106 of FIG. 3A implements the described methods. In particular, with reference to FIG. 3B, the steps of the described methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the memory 216. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The application program 333 is typically pre-installed and stored in the ROM 360 by a manufacturer, prior to distribution of the electronic device 106. However, in some instances, the application programs 333 may be supplied to the user encoded on one or more CD-ROM (not shown) and read via the portable memory interface 306 of FIG. 3A prior to storage in the memory 216 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 106. Examples of transitory or non-tangible computer readable transmission media that may also participate in the provision of software, application programs, instructions and/or data to the device 106 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 106 and the application programs 333 may manipulate the interface in a functionally adaptable manner to control the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the memory 216. The memory 216 comprises read only memory (ROM) 360 and random access memory (RAM) 370. The processor 305 is able to execute the application programs 333 stored in one or both of the connected memories 360 and 370. When the electronic device 106 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 through 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organised into blocks, which perform specific tasks or handle specific events that occur in the electronic device 106. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the electronic device 106.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 333, and is performed by repeated execution of a fetch-execute cycle in the processor 305 or similar programmatic operation of other independent processor blocks in the electronic device 106. The described methods may alternatively be implemented in dedicated hardware such as one or more integrated circuits performing the functions or sub functions of described processes. Such dedicated hardware may include graphic processors, digital signal processors, or one or more microprocessors and associated memories.

FIG. 4 is a flowchart illustrating a method 400 for automatically providing content to a user based on contextual information. This method 400 will be described with reference to FIGS. 1-3. As described below, the steps of the method 400 are implemented as one or more software code modules of the software application program 333 resident in the ROM 360 and being controlled in execution by the processor 305 of the device 106. As described above, one of the user devices 106 and/or the server 104 may be in the form of a computer system. In other arrangements, one or more of the steps of method 400 may be executed on the server 104. In still other arrangement, one or more of the steps may be executed on the user device 106 while other steps of the method 400 are executed on the server 104. Moreover, one or more steps of the method 400 may be deleted, added, or reordered without departing from the scope of the present disclosure.

The method 400 begins at step 402 where one or more contextual parameters are monitored under execution of the processor 305. In one aspect, the monitoring module 202 monitors the contextual parameters. As described previously, the monitored contextual parameters include device parameters (such as device type, connectivity, screen size), user parameters (such as permissions, meeting schedule, role in the organization, and projects), and/or environment parameters (such as date, time, weather, geographical location, and so on).

At step 404, the monitoring module 202, under execution of the processor 105, determines whether the value of any contextual parameters has changed. Examples of changes include change in device connectivity, change in device type, upcoming meeting, change in geographical location, change in weather, etc. If no changes are detected, the monitoring module 202 continues to monitor the contextual parameters. Alternatively, if one or more parameter values change, the monitoring module 202 is configured to compare the changed parameter values with threshold values for those contextual parameters at step 406.

Again, if the monitored parameter values are under the threshold values, the monitoring module 202 continues to monitor the contextual parameters. However, if the monitored parameters exceed the threshold values, the CI system 102 proceeds to retrieve content from the content sources 110 or the memory 216 based on the changed contextual parameter, at step 408. For instance, if the changed parameter is an upcoming meeting, the retrieved content may include accessible files or notes relevant to a scheduled meeting, driving directions to the meeting, information about the customer, meeting notes from any previous meetings attended by the user or the user's colleagues, action items discussed in previous meetings, approximate time to reach the meeting, and so on. For other contextual parameters, other forms of content may be retrieved. It will be understood that the retrieved content examples disclosed herein are merely exemplary and the method 400 may retrieve any other content stored on the content sources without departing from the scope of the present disclosure.

If the user device 106 has ample free memory or is connected to the network 120 through a Wi-Fi network, the input module 204 may be configured to retrieve the data from the content sources 110. However, if the user device 106 is low on available memory or is connected to the network 120 through a cellular data network, the input module 204 may be configured to retrieve only links to the actual data or properties of the actual data.

Subsequently (at step 410), weights are applied to the retrieved content. The weights may be configured by the user 108. Moreover, the weights may be automatically modified based on user input. The decision engine 206 retrieves the updated weights from the weightage module 214 and applies those weights to the retrieved content.

At step 412, the decision engine 206, under execution of the processor 105, recommends results based on the weighted retrieved content. In one aspect, the decision engine 206 generates a score for the weighted content and then ranks the content based on the scores. Furthermore, if one result has a score that is significantly higher than all the other scores, the decision engine 206 may provide that single result as a decision. Alternatively, the decision engine 206 may list the first few results as recommended content. The number of results that are listed can also be configurable. For instance, the user 108 may configure the decision engine 206 to recommend only the first five (5), ten (10) or fifteen (15) results.

Once the relevant results are recommended, the decision engine 206 can decide further segregate the results and/or decide to download the content or retrieve links to the content at step 414. These decisions are based on device parameters. As described previously, the recommended results are segregated based on screen size, network connectivity and available applications, while the decision to download content or hyperlinks to the content is based on network connectivity and available memory 216. If the user device 106 is connected to the network 120 through a Wi-Fi or LAN network and has ample available memory, the decision engine 206 can download the recommended results from the content sources 110 and store the recommended results in the memory 216, at step 416. For other arrangements, the decision engine 206 may be configured to retrieve links to the recommended results from the content sources 110 (step 418).

Subsequently, the recommended results are displayed on the user interface 210, at step 420. The results may be displayed as icons or a list. Moreover, the displayed results may be linked to the recommended results either in the memory of the user device 106 or in the content sources 110. When the user 108 selects a particular result, the result may be retrieved from the memory 216 or the content source 110 and displayed on the user device 106 using any suitable display application.

At step 422, the feedback module 212 detects user input. Lastly, at step 424, if the user performs any function in relation to the displayed recommended results, that input is retrieved by the feedback module 212 and utilized to automatically update the weights in the weightage module 214. If the user fails to perform any function in relation to the displayed recommended results within a specified timeframe, the feedback module 212 can utilize this inaction to also modify the weights such that the decision engine 206 generates more suitable recommendations the next time the CI system 102 is activated.

Aspects of the disclosed contextual information system and method provide a comprehensive solution for using contextual information that relates to the user, a user device, or other electronic content display system and the surrounding contextual situation of the device and user to securely deliver the right content and information to the user, thereby increasing user productivity, sales, customer satisfaction and competitive advantage. Moreover, the systems and methods disclosed herein can be implemented without any changes to the underlying company databases or servers.

IMPLEMENTATION EXAMPLE

Jack Brown and Jim Smith are employees at BFC Incorporated ("BFC"). The BFC organization implements the CI system 102 disclosed in the present disclosure. Some modules of the CI system 102 are present on BFC's server, while other modules are present on Jack's devices—a smart phone and a tablet. Specifically, the monitoring module 202, the input module 204, the weightage module 214, the decision engine 206 and the output module 208 are installed on the BFC server, while the user interface 210 and the feedback module 212 are installed on the devices of each employee. BFC has configured the weightage module 214 to apply higher weights to documents with "final" or "approved" status as opposed to documents with "WIP" or "draft" status. Similarly, documents having a later modified date have higher weights than documents having an earlier modified date. Jack is in the office and he has a one o'clock meeting with a client at a restaurant regarding project "hops". Jack has already met the client once, but has not been to this restaurant.

The monitoring module 202 monitors the contextual parameters associated with Jack and his mobile devices. At quarter to one (1), the upcoming meeting parameter exceeds the threshold and the CI system 102 is activated. Subsequently, the input module 204 accesses the corporate database to retrieve any information about project hops, the online sources to retrieve information about the client, the client representative, and the restaurant, and the content management system to retrieve properties of any files related to project hops. From the corporate database, the input module 204 learns that Jim Smith was previously assigned to this project. Accordingly, the input module 204 retrieves all the files created by Jack and Jim corresponding to project hops. The status of some of the retrieved documents prepared by Jim and Jack have an "approved" or "final" status while other documents have "draft" or "WIP" status. Based on the weights assigned to company document, the decision engine 206 ranks the retrieved files in decreasing relevancy order.

Furthermore, from the content retrieved from the corporate database, the decision engine 206 determines if Jack has had any previous meetings with the client or at that specific restaurant. As Jack has previously met with the client representative, the weightage module 214 applies low weights to the information retrieved about the client and the client representative (such as the client's website or a LinkedIn® profile of the client representative). However, because Jack has not been to this restaurant, the weightage module 214 applies high weights to the driving directions and/or restaurant menu. Based on these weights, the client and restaurant related content is also ranked.

Subsequently, the decision engine 206 selects one or more results from the ranked data to display on Jack's devices. Moreover, from the retrieved information about Jack's devices, the decision engine 206 learns the capabilities of Jack's devices. The smart phone has a 4 inch screen and 3G and Wi-Fi capabilities, while the tablet has a 9 inch screen with only Wi-Fi capabilities. Based on this knowledge, the decision engine 206 decides to push the recommended project files to the tablet and the recommended driving direction and food menu to the smart phone. Moreover, as the tablet only has Wi-Fi capabilities, the decision engine 206 forwards and stores the recommended filed on the tablet before Jack leaves for the meeting and provides links to the driving directions and restaurant menu on the smart phone.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method to be implemented by a system for providing at least one of a document or file to a user device of the system, via a network, based on at least one contextual parameter, the method comprising:
retrieving, in response to a change in value of at least one contextual parameter, at least one document or file from at least one source based on the at least one contextual parameter, the changed contextual parameter relating to a scheduled event which will result in the user device being disconnected from the network;
applying weights to the retrieved document or file and the at least one contextual parameter, based on a history of the document or file;
recommending the retrieved document or file to the user based on the weighted document or file and the weighted at least one contextual parameter;
providing the recommended document or file to the user device of the system in a first form, the first form being dependent on at least one device parameter of the user device;
and providing content related to the recommended document or file to another user device of the system in a second form, the second form being dependent on at least one device parameter of said another user device,
wherein the user device and the another user device are different types of user devices, and the content related to the recommended document or file is a different type of content that relates to the scheduled event; and
wherein the at east one contextual parameter s independent of other user devices of the system.

2. The method of claim 1, wherein the weights are configurable according to a user input received via the user device, the user input associated with the provided document or file.

3. The method of claim 1, wherein the document or file is retrieved from the at least one source if the change in value of the at least one contextual parameter exceeds a threshold value.

4. The method of claim 1, wherein the recommended document or file includes a uniform resource locator.

5. The method of claim 1, wherein the at least one contextual parameter includes at least one of a device parameter, a user parameter and an environment parameter.

6. The method of claim 1, wherein the at least one device parameter includes at least one of device type, network connectivity, screen size, available memory and installed application.

7. The method of claim 1, wherein the at least one source includes a source external to the system.

8. The method of claim 1, wherein the recommended document or file and the content related to the recommended document or file are provided to the respective user devices based on device parameters thereof.

9. The method of claim 1, wherein the scheduled event includes a geographical location.

10. The method of claim 1, wherein the recommended document or file is provided to the user device in a manner that the recommended document or file is executed by the user device independent of user input.

11. The method of claim 1, wherein the retrieved document or file is non-multimedia document or file.

12. The method of claim 1, wherein:
the at least one contextual parameter is based on a change in geographical distance relative to the scheduled event or on a predetermined time prior to the scheduled event, the recommended document or file and the content related to the recommended document or file being provided at the predetermined time or when the change in geographical distance occurs.

13. A contextual information system for providing at least one of a document or file to a user device of the system, via a network, based on at least one contextual parameter, the system comprising:
an input module configured for retrieving, in response to a change in value of at least one contextual parameter, at least one document or file from at least one source based on the at least one contextual parameter, the changed contextual parameter relating to a scheduled event which will result in the user device being disconnected from the network;
a decision engine configured for:
applying weights to the retrieved document or file and the at least one contextual parameter, based on a history of the document or file; and
recommending the retrieved document or file to the user based on the weighted document or file and the weighted at least one contextual parameter; and
an output module configured for:
providing the recommended document or file to a user device of the system in a first form, the first form being dependent on at least one device parameter of the user device and
providing content related to the recommended document or file to another user device of the system in a second form, the second form being dependent on at least one device parameter of said another user device,
wherein, the user device and the another user device are different types of user devices, and the content related to the recommended document or file is a different type of content that relates to the scheduled event; and
wherein the at least one contextual parameter is independent of other user devices of the system.

14. The contextual information system of claim 13, wherein the weights are configurable according to a user input received via the user device, the user input associated with the provided document or file.

15. The contextual information system of claim 13, wherein the document or file is retrieved from the at least one source if the change in value of the at least one contextual parameter exceeds a threshold value.

16. The contextual information system of claim 13, wherein the recommended document or file includes a uniform resource locator.

17. The contextual information system of claim 13, wherein the at least one contextual parameter includes at least one of a device parameter, a user parameter and an environment parameter.

18. The contextual information system of claim 13, wherein the at least one device parameter includes at least one of device type, network connectivity, screen size, available memory and installed application.

19. The contextual information system of claim 13, further comprising a weightage module configured to store at least one weight associated with the at least one contextual parameter.

20. The contextual information system of claim 13, further comprising a user interface configured to receive a user input.

21. The system of claim 13, wherein the at least one source includes a source external to the system.

22. The system of claim 13, wherein the recommended document or file and the content related to the recommended document or file are provided to the respective user devices based on device parameters thereof.

23. The system of claim 13, wherein the scheduled event includes a geographical location.

24. The system of claim 13, wherein the recommended document or file is provided to the user device in a manner that the recommended document or file is executed by the user device independent of user input.

25. The system of claim 13, wherein the retrieved document or file is non-multimedia document or file.

26. The system of claim 13, wherein the user device serves as the system.

27. A computer readable storage medium comprising instructions executable by a processor of a system for providing at least one of a document or file to a user device of the system, via a network, based on at least one contextual parameter, the instructions when executed by the processor causes the system to perform a method, the method comprising:
retrieving, in response to a change in value of at least one contextual parameter, at least one document or file from at least one source based on the at least one contextual parameter, the changed contextual parameter relating to a scheduled event which will result in the user device being disconnected from the network;
applying weights to the retrieved document or file and the at least one contextual parameter, based on a history of the document or file;
recommending the retrieved document or file based on the weighted document or file and the weighted at least one contextual parameter;
providing the recommended document or file to a user device of the system in a first form, the first form being dependent on at least one device parameter of the user device;
and providing content related to recommended document or file to another user device of the system in a second form, the second form being dependent on at least one device parameter of said another user device,
wherein the user device and the another user device are different types of user devices and the content related to the recommended document or file is a different type of content that relates to the scheduled event; and
wherein the at least one contextual parameter is independent of other user devices of the system.

28. The computer readable storage medium of claim 27, wherein the weights are configurable according to a user input received via the user device, the user input associated with the provided document or file.

29. The computer readable storage medium of claim 27, wherein the document or file is retrieved from the at least one source if the change in value of the at least one contextual parameter exceeds a threshold value.

30. The computer readable storage medium of claim 27, wherein the recommended document or file includes a uniform resource locator.

31. The computer readable storage medium of claim 27, wherein the at least one contextual parameter includes at least one of a device parameter, a user parameter and an environment parameter.

32. The computer readable storage medium of claim 27, wherein the at least one device parameter includes at least one of device type, network connectivity, screen size, available memory and installed application.

33. The computer readable storage medium of claim 27, wherein the at least one source includes a source external to the system.

34. The computer readable storage medium of claim 27, wherein the recommended document or file and the content related to the recommended document or file are provided to the respective user devices based on device parameters thereof.

35. The computer readable storage medium of claim 27, wherein the scheduled event includes a geographical location.

36. The computer readable storage medium of claim 27, wherein the recommended document or file is provided to the user device in a manner that the recommended document or file is executed by the user device independent of user input.

37. The computer readable storage medium of claim 27, wherein the retrieved document or file is non-multimedia document or file.

38. The computer readable storage medium of claim 27, wherein the user device to which the recommended document or file is provided includes the processor.

* * * * *